US007953607B2

(12) United States Patent  
McNairy

(10) Patent No.: US 7,953,607 B2
(45) Date of Patent: May 31, 2011

(54) INTEGRATED MAIL, INTERNET, AND TELEPHONY EVENT TRACKING SYSTEM

(76) Inventor: Charles F. H. McNairy, Newport Beach, CA (US)

( * ) Notice: Subject to any disclaimer, the term of this patent is extended or adjusted under 35 U.S.C. 154(b) by 353 days.

(21) Appl. No.: 11/859,595

(22) Filed: Sep. 21, 2007

(65) Prior Publication Data

US 2008/0077424 A1   Mar. 27, 2008

Related U.S. Application Data

(60) Provisional application No. 60/846,478, filed on Sep. 22, 2006, provisional application No. 60/848,099, filed on Sep. 29, 2006.

(51) Int. Cl.
  *G06Q 10/00* (2006.01)
  *G06Q 40/00* (2006.01)
  *H04M 1/00* (2006.01)
(52) U.S. Cl. ............. 705/1.1; 705/38; 705/39; 709/201; 379/386
(58) Field of Classification Search .................... 705/1.1, 705/38–39; 709/201; 379/386
  See application file for complete search history.

(56) References Cited

U.S. PATENT DOCUMENTS

| | | | | |
|---|---|---|---|---|
| 5,930,764 | A * | 7/1999 | Melchione et al. | 705/10 |
| 6,463,149 | B1 * | 10/2002 | Jolissaint et al. | 379/265.09 |
| 6,783,063 | B2 * | 8/2004 | Holden | 235/379 |
| 7,006,994 | B1 * | 2/2006 | Campbell et al. | 705/40 |
| 7,068,775 | B1 * | 6/2006 | Lee | 379/265.02 |
| 2001/0047326 | A1 * | 11/2001 | Broadbent et al. | 705/38 |
| 2002/0007342 | A1 | 1/2002 | Sellers et al. | |
| 2002/0042773 | A1 * | 4/2002 | Fugitte et al. | 705/39 |
| 2002/0087383 | A1 * | 7/2002 | Cogger et al. | 705/10 |
| 2002/0095454 | A1 | 7/2002 | Reed et al. | |
| 2003/0149647 | A1 | 8/2003 | Youngblood, Jr. | |
| 2004/0148211 | A1 * | 7/2004 | Honarvar et al. | 705/7 |
| 2006/0108266 | A1 | 5/2006 | Bowers et al. | |
| 2006/0143033 | A1 | 6/2006 | Foth et al. | |
| 2006/0182055 | A1 | 8/2006 | Coffee et al. | |
| 2007/0041574 | A1 * | 2/2007 | Baldovinos | 379/386 |
| 2008/0077525 | A1 * | 3/2008 | Willey et al. | 705/40 |

OTHER PUBLICATIONS

PCT International Search Report, Jan. 3, 2008.

* cited by examiner

*Primary Examiner* — Fadey S Jabr
(74) *Attorney, Agent, or Firm* — Gordon & Rees LLP

(57) ABSTRACT

A method of tracking and acting on events related to the delivery of a mail piece is provided. An integrated record associated with an addressee of a mail piece is created. The mail piece is given a unique identifier and the mail piece is associated with the addressee. The mail piece is placed in a mail stream and the date and nature of associated delivery events is recorded. After a predetermined delivery event occurs, a follow-up communication is transmitted to the addressee, and the date of this follow-up communication is recorded. The date of any response by the addressee to the follow-up communication is also recorded. To the integrated record associated with the addressee is added the date and nature of the delivery events associated with the mail piece, the date of the follow-up communication, and the date of any response by the addressee to the follow up communication.

22 Claims, 4 Drawing Sheets

Transaction Detail

Return 300

Recipient
John Doe
RECIPIENT ADDRESS
CITY, ST ZIP

Transaction Information
Mail Service: Certified
Service Options: Electronic Confirmation
Return Receipt
Tracking Number: 7113 8257 1470 7075 4649
Reference Number: 65976692

Postage Fees: $4.64

Transaction History 310

| Date | Event Description | Detail |
|---|---|---|
| 5/2/2007 2:15 PM | Returned Return Receipt | Signed Return Receipt |
| 5/3/2007 1:01 PM | Automated Call | Satisfies Customer Service Option From Telephone Menu; call duration 25 minutes 319 → 318 |
| 5/2/2007 9:05 AM | Automated Call | No Answer, scheduled for second attempt |
| 5/2/2007 2:01 PM | Email | Email regarding delinquency; joe@doe.com 317 |
| 5/2/2007 2:00 PM | Text Message | Text Message regarding delinquency 316 |
| 4/23/2007 12:01 PM | USPS Event | DELIVERED at LOS ANGELES, CA 315 |
| 4/23/2007 9:57 PM | USPS Event | ATTEMPTED / NOTICE LEFT at LOS ANGELES, CA 314 |
| 4/23/2007 10:04 AM | USPS Event | ARRIVAL AT UNIT at LOS ANGELES, CA 313 |
| 4/20/2007 2:14 PM | USPS Event | ELECTRONIC SHIPPING INFO RECEIVED at TEMECULA, CA |
| 4/20/2007 12:35 PM | Letter Mailed | USPS Firm Mailing Book, Batch#: 201423 312 |
| 4/20/2007 10:24 AM | Letter Printed | 3 pages, Batch#: 2890 |
| 4/20/2007 10:11 AM | Record Imported | Client Data File Import: "Import8881.txt" 311 |

Transaction Images 320

| Download | View | Description |
|---|---|---|
|  |  | Image of Letter Sent 326 |
|  |  | Image of USPS Firm Mailing Book 324 |
|  |  | Image of Return Receipt 322 |

Print this page

Fig. 3

INTEGRATED MAIL, INTERNET, AND TELEPHONY EVENT TRACKING SYSTEM

CROSS-REFERENCE TO RELATED APPLICATIONS

The present application claims priority to currently pending U.S. provisional application Ser. No. 60/846,478 filed Sep. 22, 2006, entitled "MAIL/IP TELEPHONY CONVERGENCE," and also to currently pending U.S. provisional application Ser. No. 60/848,099 filed Sep. 29, 2006, entitled "AUTOMATED SYSTEM FOR COMMUNICATING WITH DELINQUENT BORROWERS," both of which are incorporated by reference into the instant application as if set forth verbatim.

FIELD OF THE INVENTION

The present invention relates generally to systems for tracking and recording communications events, and more particularly to systems for tracking, recording, and acting upon communications events, including mail delivery events, associated with an addressee of a mail piece.

BACKGROUND OF THE INVENTION

Millions of mail pieces are sent, in transit, or delivered every day, both in the United States and around the world. As used herein, a mail piece is any item intended to be delivered to a specific recipient, and given to a delivery service of any kind for delivery. For example, and without limitation, the delivery service may be the United States Postal Service, private shipping companies, or couriers.

Many mail pieces have highly important and/or time sensitive contents. On such mail pieces, senders frequently take advantage of mail piece tracking systems, generally provided by the delivery service, so they can ensure that important mail pieces arrive on schedule, and take corrective action if they do not. Furthermore, many senders wish to immediately follow up with the recipient of a piece of mail after it arrives.

The type of corrective action or follow-up that a sender makes in response to the delivery or failed delivery of a mail piece depends on many factors, including the nature of the delivery event itself. For example, if a mail piece is rejected by an addressee, a sender may wish to immediately speak with the addressee to discuss why it was rejected.

Additionally, the sender's response to a delivery event also depends on the nature of the mail piece, and the nature of the addressee. For example, if the sender is a lender who sends a default notice to a borrower, the sender may wish to speak with the borrower immediately after the borrower receives the notice in the mail. After speaking with the recipient of the mail piece, the sender may also wish to have evidence that the conversation took place, so that the recipient cannot later claim to have been unaware of the mail piece.

However, given the volume of mail sent by many senders, it is extremely difficult for senders to intelligently respond to the delivery events associated with each mail piece. This difficulty is only magnified by variables related to the nature of the sender's relationship with the addressee and the nature of the mail piece itself.

What is needed is a way for senders to monitor the delivery status of mail pieces in a way that takes into account the nature of the mail piece and the relationship with the addressee. What is needed is a way for senders to contact addressees of mail pieces so that the sender can follow up with the addressee immediately upon the delivery (or non-delivery) of a mail piece. Finally, senders need a way to put all of this information into a single record, or multiple interconnected records, associated with the addressee. By having all of this information available, senders would have evidence of all communications with a given mail recipient, and could use the record to more effectively communicate with the addressees of their mail.

SUMMARY OF THE INVENTION

The present invention addresses these needs by providing, in one aspect, a method of tracking and acting on events related to the delivery of a mail piece. An integrated record associated with an addressee of a mail piece is created. The mail piece is given a unique identifier and the mail piece is associated with the addressee. The mail piece is placed in a mail stream and the date and nature of associated delivery events is recorded. After a predetermined delivery event occurs, a follow-up communication is transmitted to the addressee, and the date of this follow-up communication is recorded. The date of any response by the addressee to the follow-up communication is also recorded. To the integrated record associated with the addressee is added the date and nature of the delivery events associated with the mail piece, the date of the follow-up communication, and the date of any response by the addressee to the follow up communication. Any or all steps may be performed automatically in some aspects of the invention.

The method may further comprise recording and adding to the integrated record the nature of the follow-up communication and of any response by the addressee to the follow-up communication. In some embodiments, the content of the follow-up message may be generated automatically. In some embodiments, the date of communications between the addressee and a predetermined party are recorded and added to the integrated record associated with the addressee. Also optionally, the date of communications with a predetermined party and regarding the addressee are recorded and added to the integrated record associated with the addressee.

In another aspect of the invention, a method of tracking and acting on events related to the delivery of a mail piece is again provided. A sender transmits information about an addressee to an independent integrated record keeper, who creates an integrated record associated with the addressee, and adds the information to the record. A mail piece for delivery to the addressee is generated, and the independent integrated record keeper associates the mail piece with the addressee's associated integrated record. The mail piece is sent to the addressee by placing it in a mail stream of a delivery service not affiliated with the independent integrated record keeper. The independent integrated record keeper monitors delivery events associated with the mail piece, and automatically causes a communication to be transmitted to the addressee upon the occurrence of a predetermined delivery event. The predetermined delivery event may the predicted delivery of a mail piece.

In another aspect of the invention, a method of tracking and acting on events related to the delivery of a mail piece to a delinquent borrower is provided. An integrated record associated with the delinquent borrower is created. A mail piece is given a unique identifier and is associated with the delinquent borrower. The mail piece is placed in a mail stream, and the date and nature of delivery events associated with the mail piece are recorded. A follow-up communication is transmitted to the delinquent borrower after a predetermined delivery event occurs, and the date of this communication is recorded. The date of any response by the delinquent borrower to the follow-up communication is also recorded. Finally, the date and nature of delivery events associated with the mail piece, the date of the follow-up communication, and the date of any response to the follow-up communication, are all added to the integrated record.

Optionally, the follow-up communication transmitted to the delinquent borrower may present the delinquent borrower with the option of being connected to a live designated representative of the owner of the delinquent borrower's debt, such as a lending agency or foreclosure attorney representative. Also optionally, the integrated record may be used to triage the delinquent borrower relative to other delinquent borrowers.

In another embodiment of the present invention, a method of communicating with a delinquent borrower is provided. The occurrence of a default condition is identified, and a letter to a delinquent borrower is generated and then sent to the delinquent borrower. After it is determined whether the delinquent borrower accepted delivery of the letter, the delinquent borrower is contacted and communicated with to determine the delinquent borrower's condition. The delinquent borrower is then triaged relative to other delinquent borrowers, and a customer service representative then communicates with the delinquent borrower.

BRIEF DESCRIPTION OF THE DRAWINGS

FIG. 3 is a screen shot of an integrated record history.

DETAILED DESCRIPTION

Figure 1:
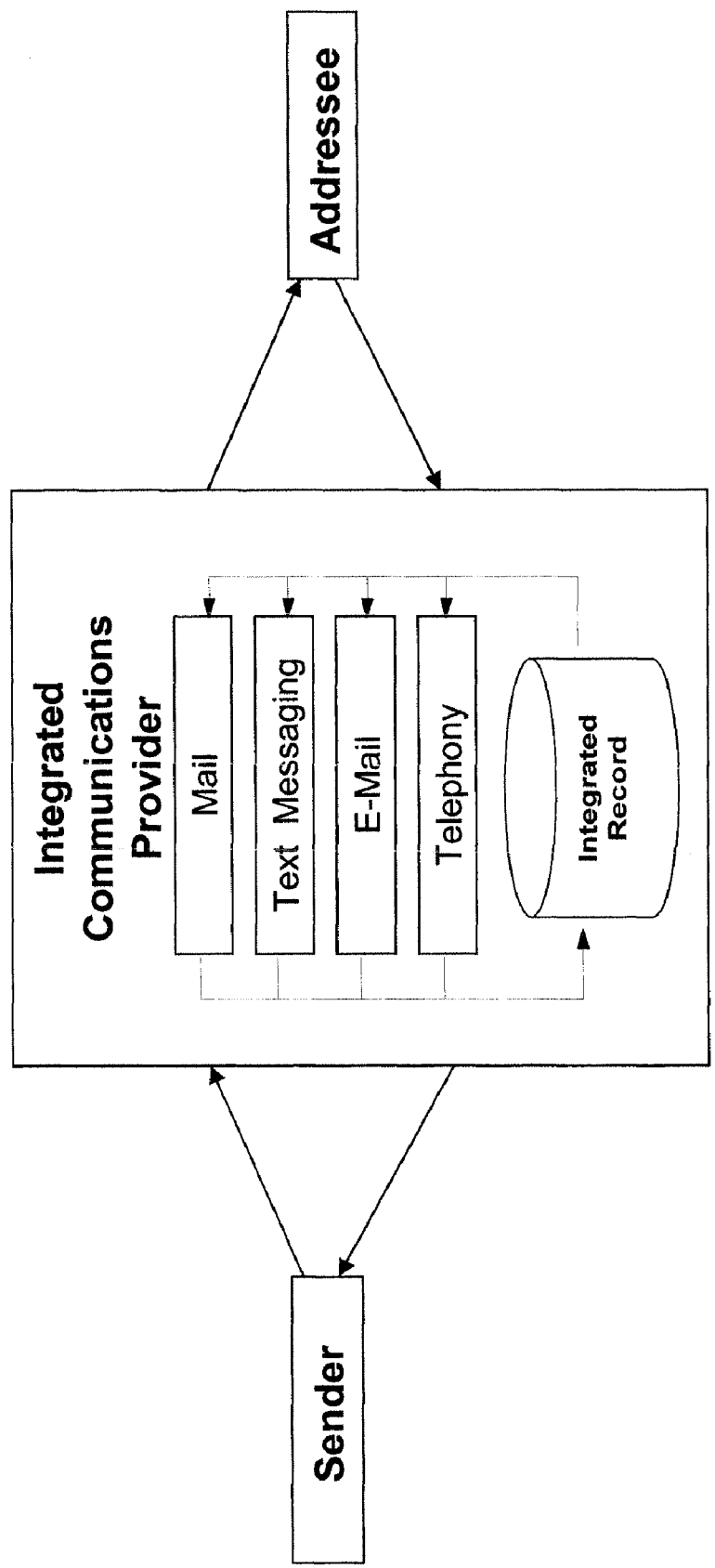
FIG. 1 is a chart generally showing the interrelationship of sender, integrated communications provider, and addressee, and the communications between them.

Exemplary embodiments of the invention are described in detail below with reference to the appended figures, wherein like elements are referenced with like numerals throughout. The figures do not necessarily show every detail or feature of the various embodiments of the invention, but rather illustrate exemplary embodiments and features in order to provide and enabling description of such embodiments.

The present invention provides a method of tracking and acting on communication events related to the delivery of a mail piece. This is accomplished by creating an integrated record of all such events for each addressee of a mail piece. The integrated record contains at least the date of at least one delivery event associated with the mail piece, most commonly the mailing date and delivery (or attempted delivery) date. It also contains at least the date of a follow-up communication transmitted to the addressee after the occurrence of a delivery event. If the addressee responds to the follow-up communication, at least the date of this response is also entered into the integrated record.

The integrated record allows the sender (or any other party) to quickly understand the sequence of events related to the delivery of a mail piece. As used herein, the "sender" is the party from whom, or on whose behalf, the mail piece is sent. The integrated record enables the sender (or other party) to see how long it took for a mail piece to reach the addressee, how long it took for the follow-up communication to arrive, and how long it took for the addressee to respond to the mail piece and/or the follow-up communication.

Such information is important for a number of reasons. It can be used to develop effective marketing strategies by recording which mail pieces and/or communications lead to the best responses from the recipients. It can be used to increase the chances that a debtor will pay an obligation. For example, the integrated record can be used to generate a call to the debtor immediately after the delivery of a request for payment by mail. A lender can also use the integrated record to determine which communication strategies lead to the greatest probability of debt repayment.

A further advantage of the present invention is that, when contacting the addressee, the addressee can be told the time at which the addressee received or rejected the mail piece. When confronted with this information, an addressee such as a delinquent borrower would be less likely to attempt to deceive the sender regarding the mail piece. Additionally, an integrated record of communications between a delinquent borrower and lender can be valuable evidence in court. For example, such a record will show whether the delinquent borrower was diligent in responding to a lender's communications.

Another advantage of the invention is that the integrated record it produces is ideally suited for data mining or other analysis by a computer. For example, a computer may analyze a large number of integrated records to determine which communication strategies are most effective in terms of obtaining the desired response from the addressee of a mail piece.

A method of the present invention begins by creating an integrated record associated with the addressee of a mail piece, if one has not been previously created. Next, the mail piece is associated with a unique identifier. As used in this context, "associating" the mail piece with a unique identifier means that the identity of the mail piece can be determined from the unique identifier, and vice versa, whether the association is direct or indirect. Most commonly, this unique identifier will be a delivery service tracking number. However, without limitation it may also be another unique number or code, a barcode, other unique symbol, or a radio frequency identification (RFID) tag. The particular unique identifier used is not important so long as the mail piece can be uniquely identified relative to all other mail pieces in the mail stream.

Next, the addressee of the mail piece must be associated with it. As used in this context, "associating" the mail piece with its addressee means that the identity of the addressee can be determined from the identity of the mail piece, and vice versa. Most commonly, but not necessarily, this will be done by associating the mail piece's unique identifier with the addressee. For example, and without limitation, this may be done by automatically or manually entering a mail piece's delivery tracking number into a record corresponding to the addressee, or by directly downloading the tracking number from a delivery service database into such record. This record may contain the delivery tracking numbers of several mail pieces scheduled for delivery, or previously delivered, to the same addressee.

Next, the mail piece is placed in the mail stream. The "mail stream" refers to the delivery, transport, and/or distribution system of any shipping or delivery service including, without limitation, the United States Postal Service, United Parcel Service®, Federal Express®, other private delivery services, couriers, messengers, internal corporate delivery services, and the like, regardless of the service (such as overnight, certified, return receipt, etc.) selected. Placing the mail piece in the mail stream means giving the mail piece to a delivery service for delivery to the addressee. Most commonly, placing the piece of mail in the mail stream is accomplished by depositing it at a United States Post Office or designated drop-off site.

While the mail piece is in the mail stream, the date and nature of delivery events associated with the mail piece are recorded. As used herein, a "delivery event" includes any time the mail piece is scanned in the mail stream, and any time the mail piece enters or exists the mail stream. It may also include a predicted delivery event, such as predicting the date of delivery of a mail piece based on the date it was sent. Normally, the first delivery event is when the mail piece is first given to a delivery service. Other delivery events include a mail piece being scanned as it enters a distribution or sorting facility. These delivery events that occur while the mail piece is in transit also allow the integrated record keeper to trace the progress of the mail piece and estimate a delivery date. Finally, the last delivery event is typically the delivery, failed delivery, or rejected delivery of the mail piece.

The date and nature of delivery events associated with the mail piece may be recorded automatically or manually. In either case, the source of this information is generally, but not necessarily, a delivery service database. To automatically record this information, a computer looks up an addressee's tracking number in the delivery service database, downloads the information, and then records date and nature of the delivery event into the integrated record associated with the addressee. As used herein, the word "date" is not limited to only calendar days. Rather, it may also include specific times of day. It may also refer to relative times, such as a date that occurs before or after a certain time or event. The "nature" of delivery events means a brief description of the event. It may be a very general description, such as "phone call," or it may be more specific, such as "25 minute phone call to John Doe discussing workout plan." This description may be in words, abbreviations, or letters, but it may also be in numerical codes referenced to a database of descriptions. The downloading and recording of this information may be performed automatically or manually.

After the mail piece is placed in the mail stream, and after at least one delivery event is recorded, a follow-up communication is transmitted to the addressee of the mail piece. As used in this context, the word "communication" shall mean any exchange of information from one party to another, regardless of the method used. For example, and without limitation, a communication may be a phone call, text message, email, instant message, video conference, or live in-person conversation. Furthermore, as used herein, a "follow-up communication" is any communication transmitted to the addressee in response to a delivery event of any kind. The follow-up communication is most commonly transmitted by the independent record keeper or by the sender, but it may be transmitted by anyone. The follow-up communication may or may not be generated automatically.

As an example of a follow-up communication, after a successful delivery of a mail piece a sender may wish to have a pre-recorded phone call or email automatically transmitted to the addressee of the mail piece. The phone call or email may present the addressee with a menu of options of possible responses to a communication contained in the mail piece. For example, if the mail piece contains a past due bill, an automatically generated follow-up phone call may present the addressee with a menu of options such as, agreeing to pay the bill in full, agreeing to pay the bill in part, or disputing the bill.

As another example of a follow-up communication, after an addressee rejects the delivery of a mail piece, the sender may wish to immediately have a customer service representative speak with the addressee. This may be done automatically, such as by an auto-dialer that automatically connects a customer representative with the addressee. Alternatively, it may be accomplished manually, such as by a customer service representative calling the addressee after seeing the rejected delivery in the addressee's integrated record.

Optionally, the content of the follow-up communication may be predetermined and selected based on the date and/or nature of the delivery events, the addressee's prior history with the sender, and/or the content of the mail piece. For example, if the delivery event is a successful delivery and the content of the mail piece is a product ordered by the addressee, the follow-up communication may be a recorded generic phone call offering gratitude for the purchase and encouraging the purchaser to do business with the sender again.

Once the follow-up communication is transmitted, at least the date of the follow-up communication, and optionally other relevant information, is recorded. Other information that may be recorded includes the nature of the message, or even the entire message itself. The nature of the message is a brief description of its content, such as "offered discount on next purchase" or "requested payment in full." This description may be in words or abbreviations, or codes corresponding to predetermined descriptions. Any or all of this information may be recorded either automatically or manually.

Likewise, the date of any response by the addressee to the follow-up communication is also recorded. Again, this information may be recorded either automatically or manually. Other information related to a response by the addressee, such as the nature of the response or the response itself, may also be recorded.

Finally, the date and nature of delivery events associated with the mail piece, the date of the follow-up communication, and the date of any response by the addressee to the follow-up communication, are all entered into an integrated record associated with the addressee. Any other relevant information that was recorded may also be entered into the addressee's integrated record. The steps of recording the information and entering the information into the integrated record can be two or more distinct steps, or they can also be performed simultaneously, as where the information is recorded directly into the integrated record.

The integrated record may comprise a log of all communications between a predetermined party and the addressee. It may also comprise a log of any communications about the addressee and between any party and a predetermined party. Such a record can be vital evidence if disputes arise as to whether a mail piece was ever sent or received, or as to the diligence of the sender or the addressee in responding to a communication.

Turning now to the figures, exemplary embodiments of the present invention will now be described. Referring first to FIG. 1, the relationship between the sender, integrated communications provider (ICP), and addressee are shown. It is to be understood that the relationship shown in FIG. 1 is illustrative only, and that other relationships between the parties, and different parties altogether, are contemplated by the present invention. For example, the sender and ICP may be under the control of the same entity. The ICP is generally, but not necessarily, the keeper of the integrated record.

As shown in FIG. 1, a communication from sender to addressee (or from addressee to sender) is relayed by the integrated communications provider. The communication may be mail, email, text messaging, or a telephony event. As used herein, a "telephony event" is any communication that passes over telephone lines in at least a portion of its transmission from the sender to the receiver. The ICP records at least the date of each communication between sender and addressee, and optionally other information about the communication, including a recording or transcript of the communication itself. After (or simultaneously with) recording this information, the ICP adds the information to an integrated record associated with the addressee.

Figure 2:
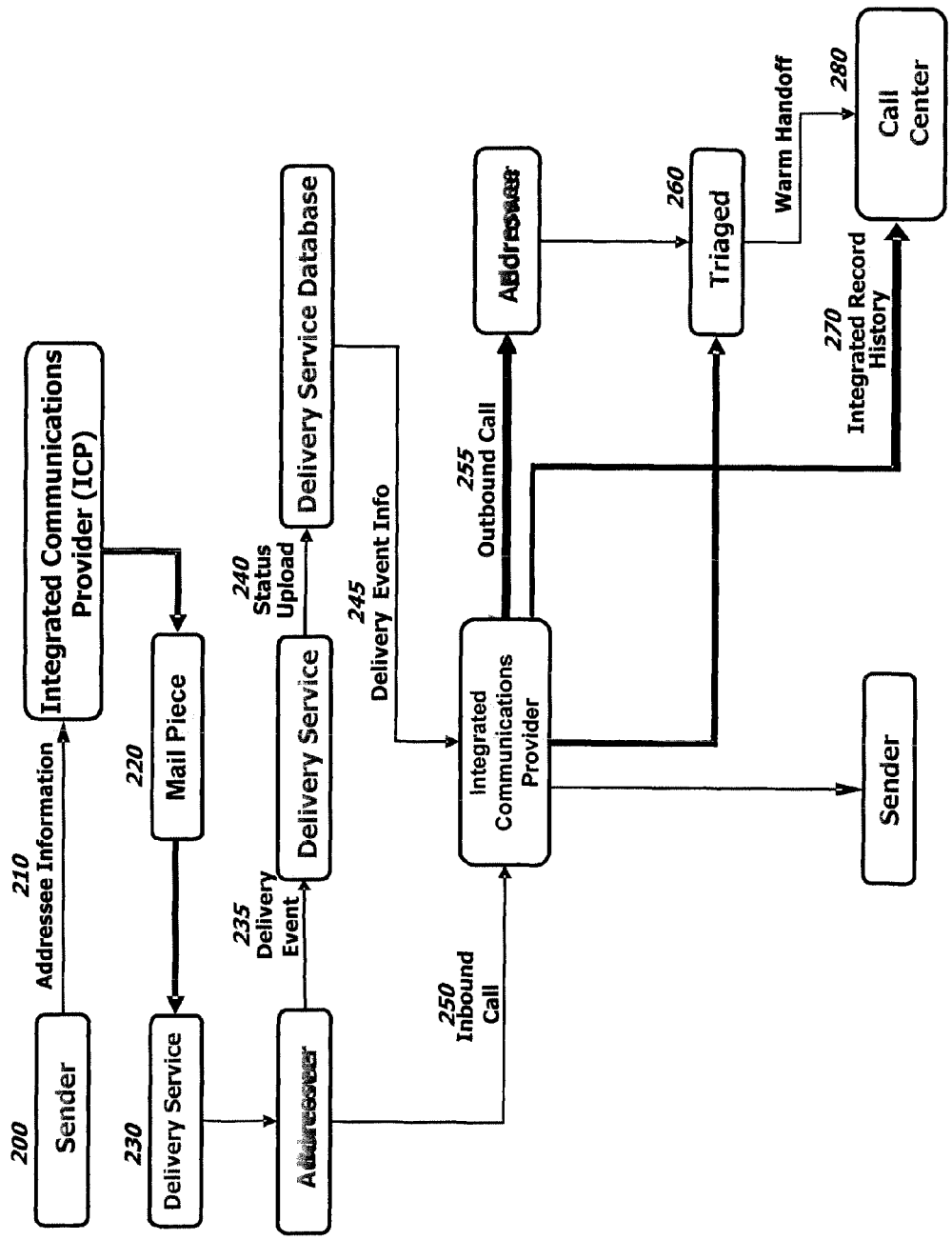
FIG. 2 is a flow chart of one embodiment of the present invention.

FIG. 2 shows an illustrative example of a method 200 of tracking and acting on events related to the delivery of a mail piece to an addressee. At step 210, the sender of the mail piece provides information about the addressee to the ICP. If it has not already done so, the ICP creates an integrated record and associates it with the addressee. For example, the integrated record may be a database labeled with the addressee's name or other unique identifier such as a numerical code.

In this example, at step 220 the ICP generates the physical mail piece using content provided by the sender. The ICP then gives the mail piece a unique identifier, which most commonly will be a delivery service tracking number. In this example, the ICP associates the addressee with the mail piece by entering the mail piece's tracking number into the addressee's integrated record. The ICP then sends the mail piece to the addressee by placing it in a delivery service mail stream at step 230.

At step 235, a delivery event (as previously defined) occurs. In this example, the delivery event is the successful delivery of the mail piece to the addressee. At step 240, the delivery service uploads at least the date of this delivery event to the delivery service database. At step 245, the ICP downloads the information uploaded at step 240. Subsequently or simultaneously, the ICP adds this information to the integrated record associated with the addressee.

At step 250, the addressee attempts to call the sender to inquire about the mail piece just received. However, the phone number given in the mail piece is actually a phone number of the ICP. Although the addressee believes he is calling the sender, the call is in fact answered by the ICP. The ICP identifies the inbound call as originating from the addressee's phone number, and adds at least the date of the call to the addressee's associated integrated record. The ICP optionally adds the exact time of the call, a description of the call, or a recording or transcript of the call to the addressee's associated integrated record.

Alternatively, if the addressee does not attempt to call the sender after receiving the mail piece, the sender may wish to place a call to the addressee. At step 255 the ICP places a call to the addressee on behalf of the sender. It is to be understood that the foregoing phone calls involving the ICP, sender, and addressee may alternatively be communications of any other kind.

At step 260, an incoming call from the addressee, or an outgoing call to the addressee, is triaged relative to other communications involving sender. This triaging step 260 involves, without limitation, the ICP using some or all of the integrated records kept on behalf of the sender to prioritize certain phone calls over others. For example, if the addressee made a credit purchase from the sender but has a large balance due, a call from the sender to this addressee would be higher priority than a call to an addressee with no balance due.

This triaging step 260 is generally performed automatically by a computer analyzing the integrated records of all addressees on hold with the ICP. At step 265, a warm handoff of the triaged phone call is made to a call center. The call center may be operated by sender, or may be a designated representative of sender. By "warm handoff" it is meant that the addressee is connected to the call center while the addressee is on hold with the ICP.

At step 270 the integrated record history screen (shown in FIG. 3, and explained further below) is made available to the call center. This allows the call center operator to view a log of at least the dates of various communications between sender and addressee, including whether the addressee accepted or refused delivery of the mail piece. By having this information readily available when the call center operator directly communicates with the addressee at step 280, the call center operator can quickly determine if the addressee is being dishonest about receiving the mail piece or diligently responding to it.

The integrated record history screen 300 mentioned previously will now be discussed with reference to FIG. 3. The screen includes a transaction history log 310 of the communications events involving the addressee and/or the mail piece. The communications events are identified at least by their date, and in this example the general and specific nature of the communication events is also provided.

At log entry 311, the date on which addressee data was provided by the sender to the ICP is shown. This data includes at least the addressee's name and address, and will generally (but not necessarily) contain the content of a letter to be sent to the addressee. This content can be provided directly in the data file. Alternatively, the ICP may maintain a database of standard letters with unique identification codes. The sender can choose which letter the ICP sends to the addressee by including this identification code with the addressee data.

At log entry 312, the date the letter to addressee was printed is shown. This log entry may also include a batch number for quality control purposes. Log entry 313 shows the date on which the letter was mailed to addressee. Again, a batch number may be included in this entry.

At log entries 313, miscellaneous delivery events are displayed. These are events such as depositing the mail piece, into the mail stream, sorting scans, or scans as the mail piece enters or exits a delivery service facility. Log entry 314 shows the date of another delivery event, namely the first attempted delivery of the mail piece. Log entry 315 shows the final delivery event, which in this example is the successful delivery of the mail piece to the addressee.

Communication events are also displayed on the integrated record history screen 300. At least the date, and optionally the general or specific nature of the communication event, is displayed on the screen. Log entry 316 shows that a text message regarding delinquency was sent to the addressee. Log entry 317 shows that an email about the same subject was sent shortly thereafter. Log entries 318 show that telephone calls were also made to the addressee, and that the addressee spoke with a customer service representative for 25 minutes.

Finally, log entry 319 shows that a signed return receipt attached to the mail piece was received. An image of this return receipt is shown in entry 322 of transaction images log 320. The operator at the call center (or any other viewer of the integrated record history screen 300) is thus able to see the signature of the person who signed for the mail piece upon delivery. This enables the operator, while on the phone with the addressee, to determine if the addressee is being dishonest about not having received the mail piece or diligently responding to it. Also displayed in the images log 320 is an image of the U.S.P.S. firm mailing book 324. The firm mailing book allows high volume mailers to get an official Post Office record of the date of deposit of mail pieces at the Post Office. Thus, the image 324 provides proof that a mail piece was in fact sent to the addressee, information helpful to an operator on the phone with the addressee. Finally, an image of the letter sent is shown at image log entry 326. Accordingly, in this example, a viewer of the integrated record history screen 300 is able to view the sequence of events surrounding the delivery of a mail piece, including communication events, as well as the mail piece itself.

Figure 4:
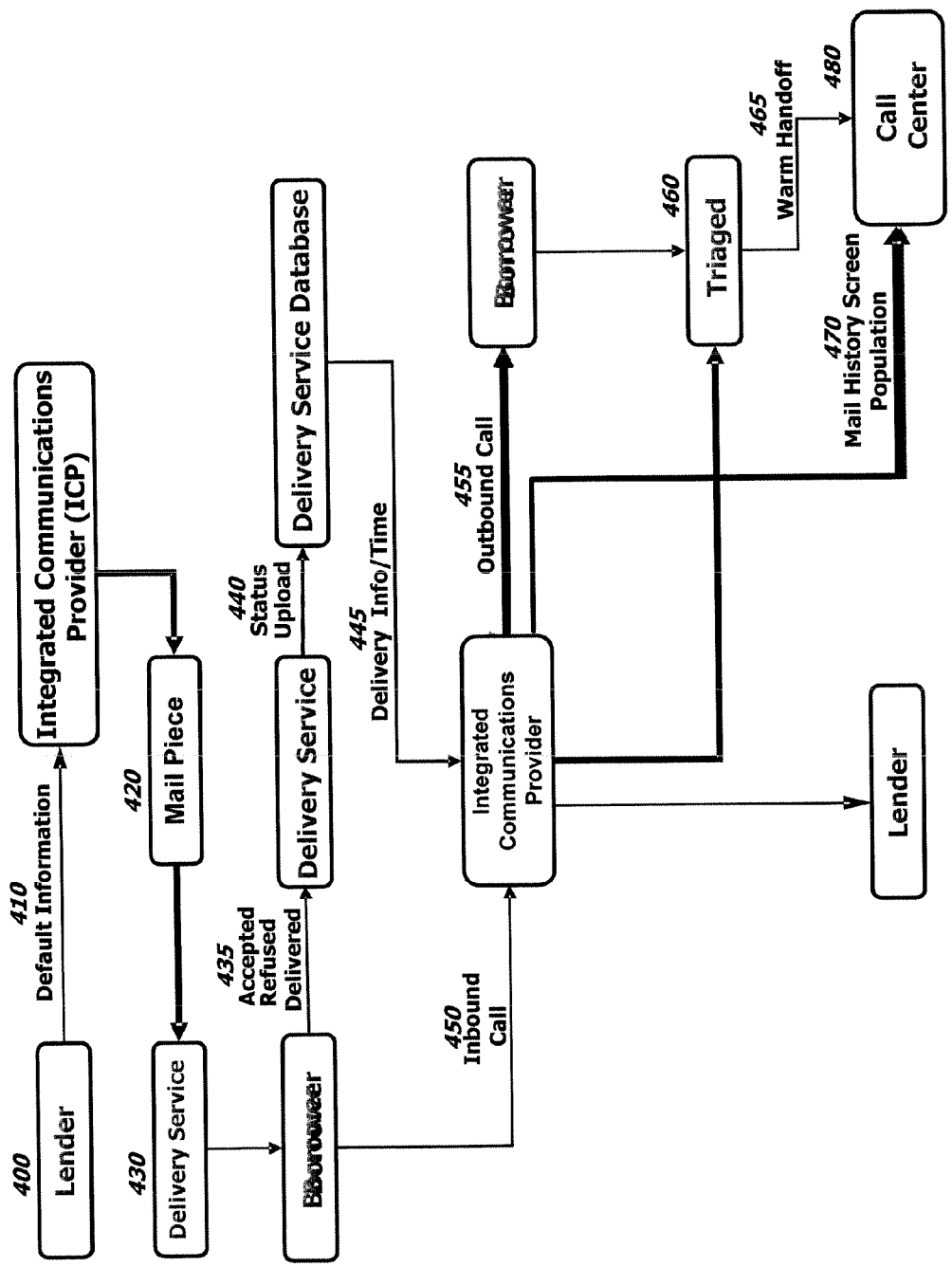
FIG. 4 is a flow chart of a lender/borrower related embodiment of the present invention.

A specific application of the present invention is now discussed with reference to FIG. 4. A method of tracking and acting on events related to the delivery of a mail piece to a delinquent borrower is shown at 400. As used herein, a "delinquent borrower" is a borrower in default as defined by the loan agreement. In this illustrative example, the lender sends default information to an integrated communications provider (ICP) at step 410. It is to be understood, however, that the ICP need not be independent from the lender and instead may be under the direct control of the lender. The default information sent to the ICP is at least the delinquent borrower's address. It may further comprise a letter, or a reference to a letter already in the possession of the ICP. Once the default information is received, the ICP creates an integrated record and associates it with the delinquent borrower (unless it has already done so).

At step 420, the ICP generates the physical mail piece using the default information provided by the lender. The ICP then gives the mail piece a unique identifier, typically a delivery service tracking number. The ICP also associates the delinquent borrower with the mail piece, typically by entering the mail piece's tracking number into the integrated record associated with the delinquent borrower. The ICP then sends the mail piece to the delinquent borrower by placing it in a delivery service mail stream at step 430.

At step 435, a delivery event occurs. In this example, the delivery event is the successful delivery of the mail piece to the delinquent borrower. At step 440, the delivery service uploads at least the date of this delivery event to its tracking information database. At step 445, the ICP downloads the information uploaded at step 440. Subsequently or simultaneously, the ICP adds this information to the integrated record associated with the delinquent borrower.

At step 450, the delinquent borrower calls the phone number given in the mail piece in an attempt to contact the lender. This call is received by the ICP, which also records at least the date of the call and adds this information to the integrated record associated with the delinquent borrower. The ICP may additionally add a description of the call, or a recording or transcript of the call, to the integrated record.

Alternatively, if the delinquent borrower does not attempt to call the lender after receiving the mail piece, the lender may wish to contact the delinquent borrower. At step 455 the ICP places a call to the delinquent borrower on behalf of the lender. It is to be understood that the foregoing phone calls involving the ICP, sender, and addressee may alternatively be communications of any other kind.

At step 460, an incoming call from, or an outgoing call to, the delinquent borrower is triaged relative to other calls involving the lenders' delinquent borrowers. For example, the delinquent borrower with the largest debt may prioritized ahead of other delinquent borrowers.

This triaging step 460 is generally performed automatically by a computer analyzing the integrated records of all delinquent borrowers that are currently on hold with the ICP. At step 465, a warm handoff of the triaged phone call is made to a call center. The call center may be operated by the lender, or by a designated representative of the lender.

Finally, at step 470 the integrated record history screen is transmitted to the call center. This allows the call center operator to view a log of when relevant communications between the lender and delinquent borrower took place. When the call center operator communicates directly with the delinquent borrower at step 480, the operator can use the information in the integrated record to verify or contradict statements made by the delinquent borrower during the phone call. In this example, the call center operator will generally be a lender or foreclosure attorney customer service representative, or other person with expertise in borrower/lender relationships.

It is to be understood that additional steps may be incorporated in different embodiments of the present invention. For example, other information may optionally be recorded and entered into the integrated record associated with the addressee. For example, the date of a communication between the addressee and a predetermined party may be recorded, either automatically or manually. One way the date of a communication between the addressee and a predetermined party may be recorded is by, for example, using a caller identification system cross-referenced with the integrated record, which contains the addressee's phone number(s). Such a system identifies incoming calls from the addressee and records the date the call was made. A similar system may be used to record the date of all emails, text messages, or instant messages from the addressee to a predetermined party. Optionally, more information about such communications, such as the nature of the communications or the communications themselves, may also be recorded.

Also optionally, the date of a communication regarding the addressee and with a predetermined party may also be recorded and added to the integrated record. One example of such a communication is an email between the sender and an independent keeper of the integrated record associated with the addressee. This may be accomplished by, for example, the sender of the email entering a unique identifier of the addressee into the message. The independent integrated record keeper detects the unique identifier in the email message and adds an entry for the date of the email to the integrated record associated with the addressee. If the communication is a telephone call, the caller The recording of the date of such a communication may be accomplished by. Also as previously discussed, other information about such a communication, such as its nature or the communication itself, may also be recorded.

Also optionally, a return receptacle may be included with the mail piece sent to the addressee. As used herein, a "return receptacle" includes, without limitation, any type of envelope, parcel, package, container, or the like. This return receptacle is associated with a second unique identifier, much as the mail piece is associated with the first unique identifier. Likewise, the addressee is also associated with this second unique identifier, either directly or indirectly. One way to accomplish this association is by marking the return receptacle with a delivery service tracking number, and entering that tracking number into the addressee's integrated record. By doing this, the date and nature of delivery events associated with the return receptacle can also be automatically recorded and then entered into the integrated record. This allows a sender to know if an addressee has replied with a mailed response and, if so, approximately when it will arrive.

Various modifications and alterations of the invention will become apparent to those skilled in the art without departing from the spirit and scope of the invention, which is defined by the accompanying claims. It should be noted that steps recited in method claims below do not necessarily need to be performed in the order they are recited. In certain embodiments, steps may be performed simultaneously. Additionally, any element in a claim that does not explicitly state "step for" performing a specified function is not to be interpreted as a "step" clause as specified in 35 U.S.C. §112, ¶ 6.

The accompanying claims should be constructed with these principles in mind.

What is claimed is:

1. A method of tracking and acting on events related to the delivery of a plurality of mail pieces, comprising:
    (a) for each of the plurality of mail pieces,
        creating an integrated record associated with an addressee of a mail piece,
        giving the mail piece a unique identifier,
        associating the addressee of the mail piece with the mail piece,
        placing the mail piece in a mail stream,
        recording the date and nature of delivery events associated with the mail piece,
        transmitting a follow-up communication to the addressee after a predetermined delivery event occurs,
        recording the date of the follow-up communication,
        recording the date of any response by the addressee to the follow-up communication,
        adding to the integrated record associated with the addressee the date and nature of the delivery events associated with the mail piece, the date of the follow-up communication, and the date of any response by the addressee to the follow-up communication,
    (b) storing the plurality of integrated records in a computer database operated by an integrated communications provider,
    (c) having the computer operated by the integrated communications provider triage the plurality of integrated records,
    (d) having the computer operated by an integrated communications provider hand off the plurality of triaged integrated records to a call center,
    (e) for each of the plurality of integrated records, displaying an integrated history screen at the call center in front of a call center operator, and
    (f) having the call center operator call the addressee of the mail piece, wherein the triaged integrated record is sent from the integrated communications provider to the call center prior to the call center initiating the call to the addressee of the mail piece, wherein each mail piece includes a phone number for the integrated communications provider which is identified as the phone number for the sender such that follow up communication from the addressee to the sender is directed to the integrated communications provider, and wherein the integrated communications provider is notified of the delivery event prior to follow up communication between the integrated communications provider and the addressee.

2. The method of claim 1, further comprising:
    recording the nature of the follow-up communication,
    recording the nature of any response by the addressee to the follow-up communication; and
    adding the nature of the follow-up communication and the nature of any response by the addressee to the follow-up communication to the integrated record associated with the addressee.

3. The method of claim 1, wherein the follow-up communication is automatically transmitted telephonically.

4. The method of claim 3, wherein the follow-up communication comprises a menu of possible responses to the message.

5. The method of claim 1, wherein each step is performed automatically.

6. The method of claim 1, further comprising:
    recording the date of a communication between the addressee and a predetermined party, and
    adding to the integrated record associated with the addressee the date of the communication between the addressee and the predetermined party.

7. The method of claim 1, further comprising:
    recording the date of a communication with a predetermined party regarding the addressee, and
    adding to the integrated record associated with the addressee the date of the communication with a predetermined party regarding the addressee.

8. The method of claim 1, further comprising:
    including a return receptacle with the mail piece,
    associating the addressee with a second unique identifier,
    associating the return receptacle with the second unique identifier,
    automatically recording date and nature of delivery events associated with the return receptacle, and
    adding the date and nature of the delivery events associated with the return receptacle to the integrated record associated with the addressee.

9. The method of claim 1, wherein the content of the follow-up communication is predetermined according to the nature of the mail piece and the nature of delivery event that occurred.

10. A method of tracking and acting on events related to the delivery of a plurality of mail pieces to a delinquent borrower, comprising:
    (a) for each of the plurality of mail pieces,
        creating an integrated record associated with a delinquent borrower,
        giving a mail piece a unique identifier,
        associating the delinquent borrower with the mail piece,
        placing the mail piece in a mail stream,
        recording the date and nature of delivery events associated with the mail piece,
        transmitting a follow-up communication to the delinquent borrower after a predetermined delivery event occurs,
        recording the date of the follow-up communication;
        recording the date of any response by the delinquent borrower to the follow-up communication;
        adding to the integrated record associated with the delinquent borrower the date and nature of the delivery events associated with the mail piece, the date of the follow-up communication, and the date of any response by the delinquent borrower to the follow-up communication,
    (b) storing the plurality of integrated records in a computer database operated by the integrated communications provider,
    (c) having the computer operated by the integrated communications provider triage the plurality of integrated records,
    (d) having the computer operated by the integrated communications provider hand off the plurality of triaged integrated records to a call center,
    (e) for each of the plurality of integrated records, displaying an integrated history screen at the call center in front of a call center operator, and
    (f) having the call center operator call the addressee of the mail piece, wherein the triaged integrated record is sent from the integrated communications provider to the call center prior to the call center initiating the call to the delinquent borrower, wherein each mail piece includes a phone number for the integrated communications provider which is identified as the phone number for the sender such that follow up communication from the addressee to the sender is directed to the integrated communications provider, and wherein the integrated communications provider is notified of the delivery event prior to follow up communication between the integrated communications provider and the addressee.

11. The method of claim 10, wherein placing the mail piece in a mail stream comprises:
sending the mail piece using a delivery service that provides updated tracking information while the mail piece is en route.

12. The method of claim 10, wherein the follow-up communication is transmitted to the delinquent borrower automatically after a predetermined delivery event occurs.

13. The method of claim 10, wherein the follow-up communication is transmitted to the delinquent borrower telephonically after a predetermined delivery event occurs.

14. The method of claim 10, wherein the follow-up communication presents the delinquent borrower with the option of being connected to a live designated representative of the owner of the delinquent borrower's debt.

15. The method of claim 14, wherein the designated representative of the owner of the delinquent borrower's debt is a lending agency representative.

16. The method of claim 14, wherein the designated representative of the owner of the delinquent borrower's debt is a foreclosure attorney representative.

17. The method of claim 10, wherein the follow-up communication comprises a text message.

18. The method of claim 10, further comprising:
using the integrated record associated with the delinquent borrower to triage the delinquent borrower relative to other delinquent borrowers.

19. The method of claim 10, further comprising:
causing literature explaining debt workout options to be delivered to the delinquent borrower,
recording the date the literature was delivered to the delinquent borrower, and
adding the date the literature was delivered to the delinquent borrower to the integrated record associated with the delinquent borrower.

20. The method of claim 10, further comprising:
recording the date and nature of a communication with a predetermined party regarding the delinquent borrower, and
adding to the integrated record associated with the delinquent borrower the date and nature of the communication.

21. The method of claim 20, wherein the communication with a predetermined party regarding the delinquent borrower comprises a telephonic communication.

22. The method of claim 20, wherein the communication with a predetermined party regarding the delinquent borrower comprises a communication transmitted over the internet.

* * * * *